United States Patent
Seydoux

(10) Patent No.: US 8,742,894 B2
(45) Date of Patent: Jun. 3, 2014

(54) AUTOMATICALLY CONTROLLED LIGHTING DEVICE, AND AN INSTALLATION INCLUDING A PLURALITY OF SUCH DEVICES

(75) Inventor: Henri Seydoux, Paris (FR)

(73) Assignee: Parrot, Paris (FR)

(*) Notice: Subject to any disclaimer, the term of this patent is extended or adjusted under 35 U.S.C. 154(b) by 1230 days.

(21) Appl. No.: 12/598,022

(22) PCT Filed: May 7, 2008

(86) PCT No.: PCT/FR2008/000639
§ 371 (c)(1),
(2), (4) Date: Mar. 16, 2010

(87) PCT Pub. No.: WO2008/152234
PCT Pub. Date: Dec. 18, 2008

(65) Prior Publication Data
US 2010/0171430 A1    Jul. 8, 2010

(30) Foreign Application Priority Data

May 10, 2007  (FR) .................................... 07 03331

(51) Int. Cl.
*G08C 19/00*   (2006.01)
*B60R 25/00*   (2013.01)

(52) U.S. Cl.
USPC ... 340/10.1; 340/10.5; 340/539.1; 340/686.6; 340/545.3

(58) Field of Classification Search
CPC ......... G08C 19/00; B60R 25/00; H05B 41/36
USPC .............. 340/539.1, 686.6, 545.3, 10.1, 10.5; 315/159, 362, 294, 154; 700/259; 307/117
See application file for complete search history.

(56) References Cited

U.S. PATENT DOCUMENTS

| | | | | |
|---|---|---|---|---|
| 5,489,827 | A | * | 2/1996 | Xia .............................. 315/294 |
| 5,541,585 | A | * | 7/1996 | Duhame et al. .............. 340/5.62 |
| 5,877,957 | A | * | 3/1999 | Bennett .......................... 700/86 |
| 5,895,985 | A |   | 4/1999 | Fischer |
| 6,002,332 | A | * | 12/1999 | King ........................ 340/545.1 |

(Continued)

FOREIGN PATENT DOCUMENTS

| | | |
|---|---|---|
| DE | 29822394 U1 | 4/2000 |
| DE | 202006007896 U1 | 8/2006 |
| EP | 1558054 A1 | 7/2005 |
| WO | 2007015009 A2 | 2/2007 |

*Primary Examiner* — Nam V Nguyen
(74) *Attorney, Agent, or Firm* — Haverstock & Owens LLP

(57) ABSTRACT

The lighting device (10; 42) includes means for switching a light source on and/or off and search means suitable for detecting and identifying neighboring objects (34, 36, 38, 40) present in the proximity of the device and provided with radio transmitter circuits, e.g. of the Bluetooth type, that are suitable for interfacing with the device. The device includes means for causing it to switch off, and possibly to switch on, said means co-operating with the search means (20) to detect the appearance or the disappearance of neighboring objects in the radio range of the lighting device, and to trigger switching off of the light source on detecting the disappearance of at least one neighboring object, conditionally as a function of predetermined criteria. Switching is controlled essentially without orders being transmitted from neighboring objects to cause the lamp to switch off or on. A plurality of devices of the same type may be configured with one another and with the neighboring objects they have detected, in a hierarchical network topology.

34 Claims, 2 Drawing Sheets

(56) References Cited

U.S. PATENT DOCUMENTS

| | | | |
|---|---|---|---|
| 6,593,856 B1 * | 7/2003 | Madau | 340/12.27 |
| 6,713,975 B2 * | 3/2004 | Yamauchi et al. | 315/308 |
| 6,970,067 B1 * | 11/2005 | Sinke et al. | 340/5.65 |
| 6,987,456 B2 * | 1/2006 | Kiel et al. | 340/573.3 |
| 7,142,932 B2 * | 11/2006 | Spira et al. | 700/83 |
| 7,155,317 B1 * | 12/2006 | Tran | 700/259 |
| 7,309,965 B2 * | 12/2007 | Dowling et al. | 315/318 |
| 7,372,355 B2 * | 5/2008 | Agronin et al. | 337/126 |
| 7,405,524 B2 * | 7/2008 | Null et al. | 315/308 |
| 7,405,724 B2 * | 7/2008 | Drummond et al. | 345/156 |
| 7,626,952 B2 * | 12/2009 | Slemmer et al. | 370/270 |
| 2002/0180367 A1 | 12/2002 | Logan | |
| 2005/0185398 A1 | 8/2005 | Scannell, Jr. | |
| 2008/0218334 A1 * | 9/2008 | Pitchers et al. | 340/539.1 |
| 2009/0230894 A1 * | 9/2009 | De Goederen et al. | 315/314 |

* cited by examiner

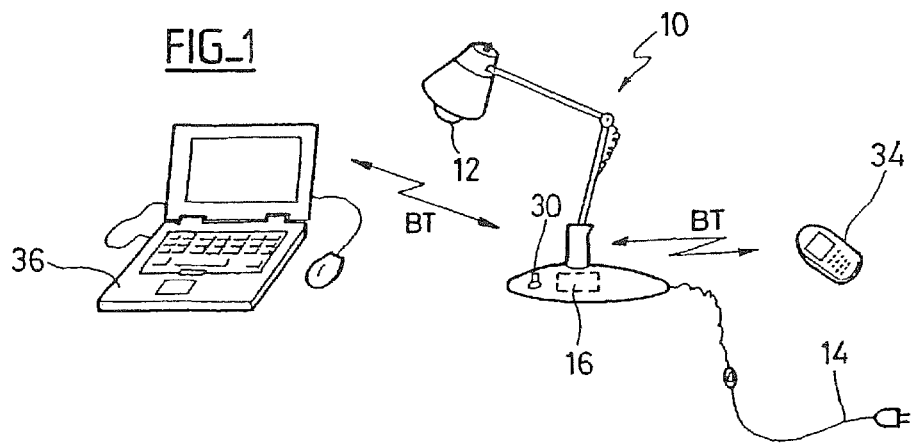
FIG_1
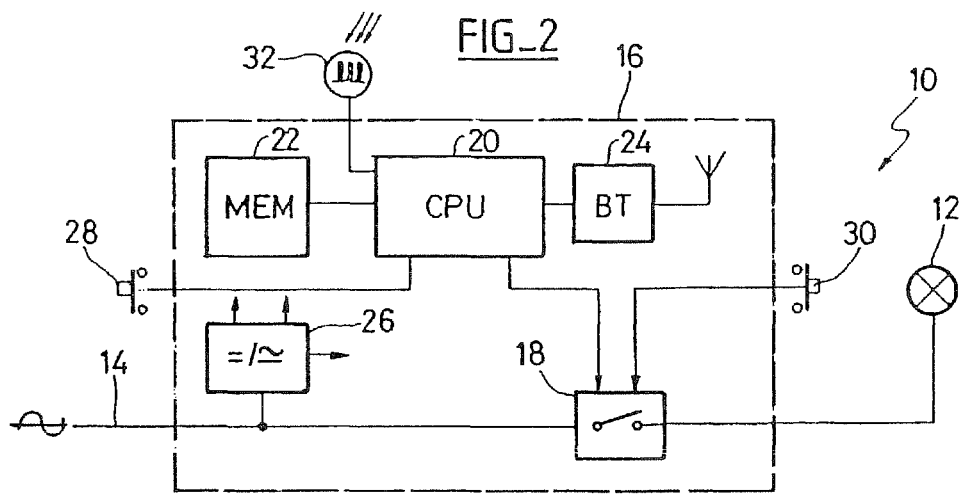
FIG_2
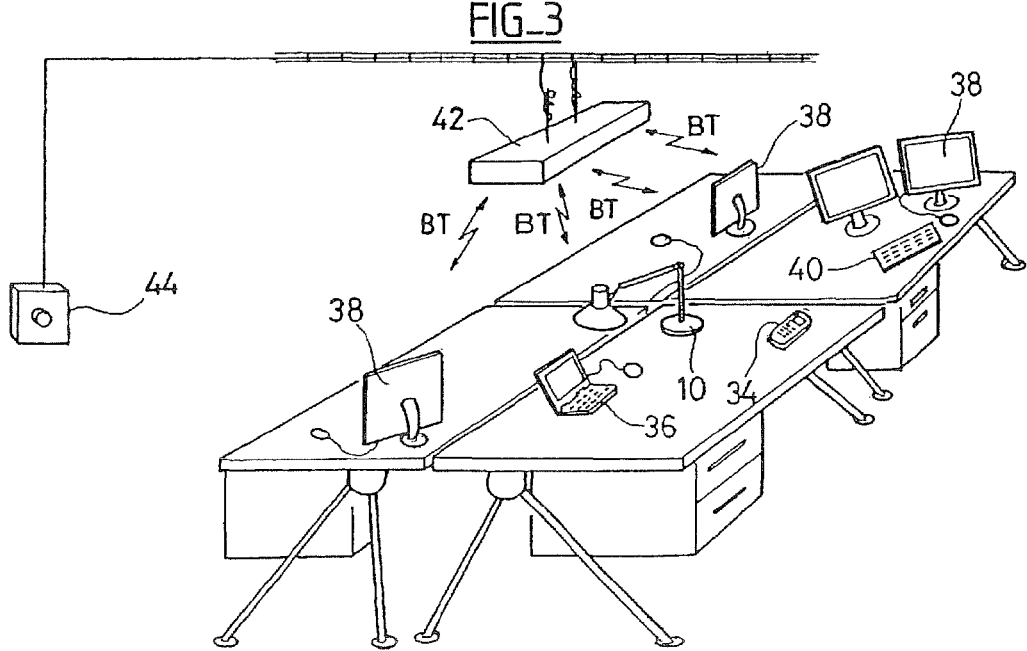
FIG_3

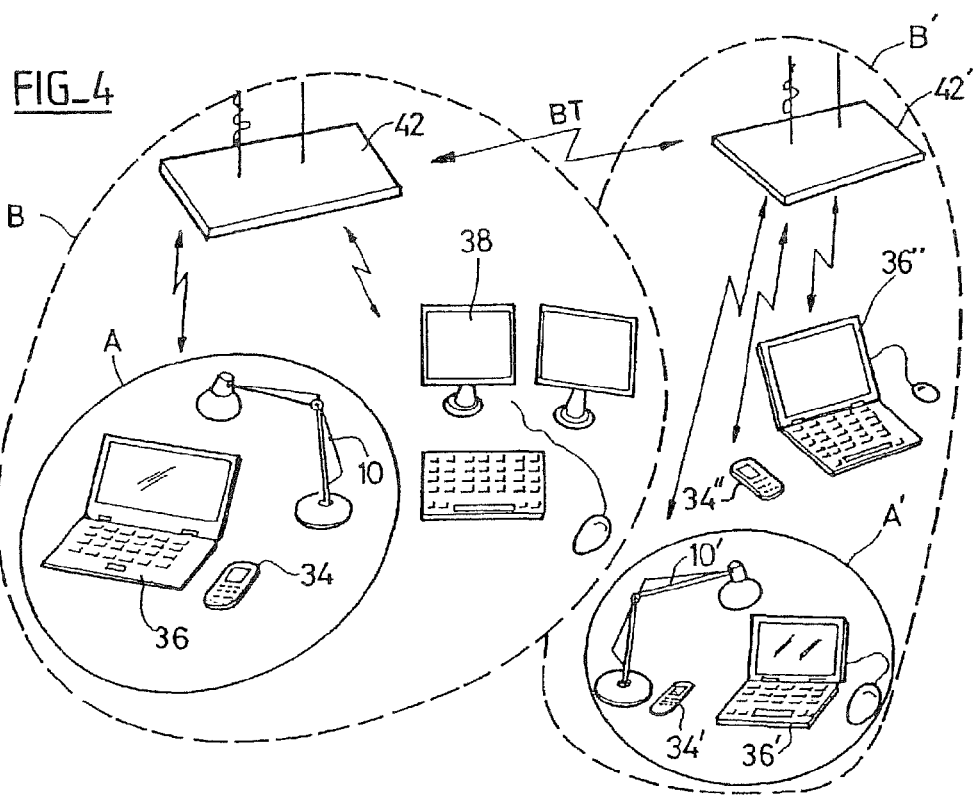
FIG_4
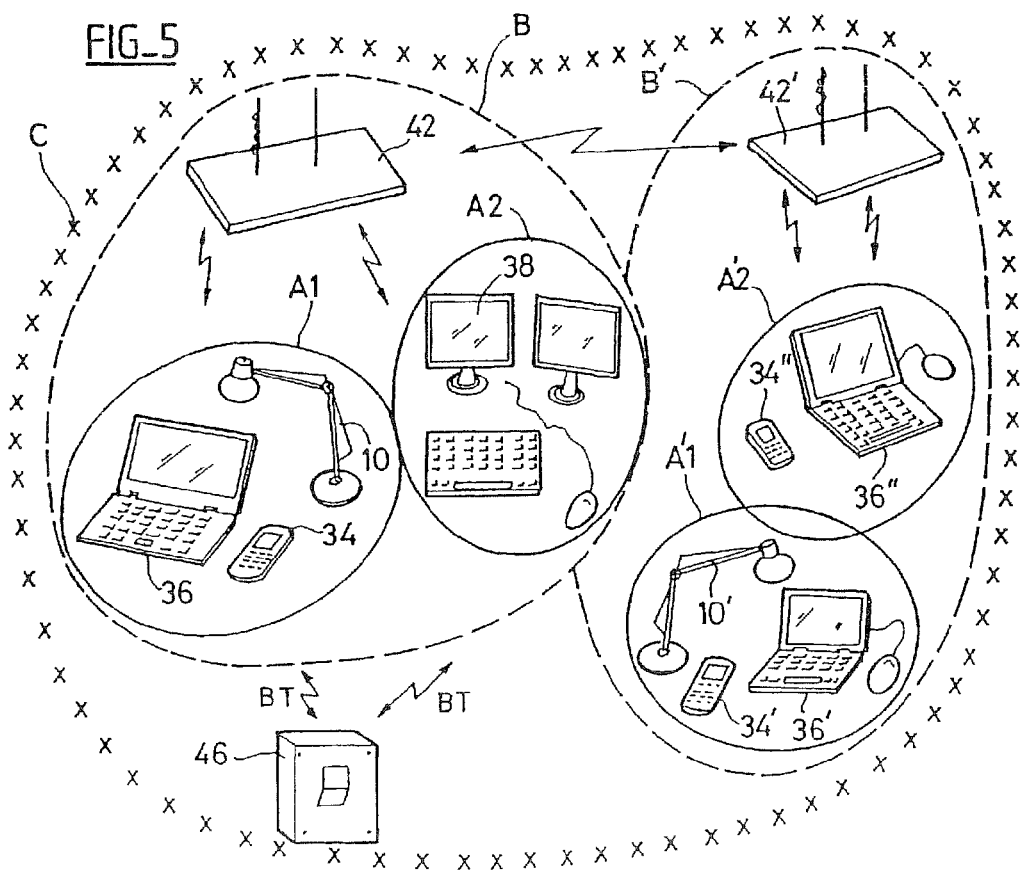
FIG_5

AUTOMATICALLY CONTROLLED LIGHTING DEVICE, AND AN INSTALLATION INCLUDING A PLURALITY OF SUCH DEVICES

The invention relates to "intelligent" lighting systems, i.e. to systems provided with controls for switching a light source on and/or off in a manner that is partially or totally automatic, essentially for the purpose of saving energy.

Thus, systems are known that are fitted with a presence detector (of the intrusion detector type) enabling a lamp to switch on when a person approaches it, and to switch off automatically after a time delay.

Various devices are also known that are fitted with infrared or radio transmitters enabling lighting systems to be remotely controlled at will depending on requirements.

Thus, DE 20 2006 007 896 U1 describes a lighting device comprising a plurality of light sources, each provided with its own control system, the sources being coupled to one another by radio chaining. By means of the coupling, switching one of the light sources on automatically leads to the other sources being switched on by an appropriate radio signal being relayed step by step from one to the next. The system may also be remotely controlled by receiving an external order transmitted by a terminal of the PDA type or the like. The object of that system is to enable a plurality of light sources to be switched on simultaneously and synchronously. It should also be observed that it responds without making any distinction amongst the people using it.

US 2005/0185398 A1 describes a lighting device that is provided, amongst other things, with means enabling a person to be identified. Identification is performed by receiving a "data packet" sent by the person from a "Personal Communicator Transmitter" such as a mobile telephone, a PDA, a remote control unit, etc. On receiving the "data packet", the device activates one or more control modules for various domestic appliances such as lamps, air conditioning, a file conveyor, etc. The aim of that system is to adapt a home automation environment (lighting, air conditioning, working environment, etc.) to the particular profile of the person activating the command sent to the device, so as to adjust the environment to the preferences of that person as previously programmed and then sent by the "data packet".

Those devices are indeed effective, however they are relatively simplistic in the way they operate, particularly concerning automatic switching off: as a general rule that involves no more than a pure and simple time delay that is adjusted empirically to provide an approximate comprise between responding quickly and the risk of untimely switching off and back on again.

Furthermore, those devices are generally adapted to controlling a single lamp, or a single group of lamps, but they are not adapted to configurations that are more complex, with distinct lighting zones, that it would be desirable to control differently depending on circumstances.

An aim of the invention is thus to provide a lighting system including automatic switch on/off means enabling the drawbacks and the limitations of present systems to be mitigated.

The main aim of the invention is to propose a system having "intelligent" switch-off means suitable for saving energy without running the risk of untimely operation. A particular aim of the invention is to provide a system enabling the activity of people in the immediate neighborhood of the lamp or lamps to be analyzed in order to switch lamps off in pertinent manner, and possibly only certain lamps in an installation of large size: for example, on a floor of offices, the system of the invention makes it possible to switch off automatically certain zones only, while continuing to light other zones where people are still present and active.

Another aim of the invention is to propose such a system that includes automatic lighting means providing great convenience in use, and also providing the possibility of control that varies as a function of certain previously-identified users.

The lighting device of the invention is of the same generic type as that disclosed in above-mentioned DE 20 2006 007 786 U1, comprising: a radio receiver circuit; search means co-operating with the radio receiver circuit to detect and identify neighboring objects present in the proximity of the device, these neighboring objects being themselves provided with radio transmitter circuits suitable for interfacing with said radio receiver circuits; and control means suitable for causing a light source to switch off.

The basic concept of the invention consists in causing the light source to be switched off and/or on automatically, merely on detecting the appearance or the disappearance of an object in the neighborhood of the light source, which detection is performed passively, merely by "listening" to the radio environment of the light source.

More precisely, for this purpose, the control means co-operate with the search means to: detect the appearance or the disappearance of said neighboring objects in the radio range of the lighting device; and cause the light source to switch off on detecting the disappearance of at least one neighboring object, conditionally as a function of predetermined switch-off criteria. These means operate essentially without a switch-off order being transmitted from the neighboring objects to the device.

Most advantageously, the control means are also suitable for causing the light source to switch on, and they co-operate with the search means to cause the light source to switch on on detecting the appearance of at least one neighboring object, conditionally as a function of predetermined switch-on criteria; and with this being essentially without a switch-on order being transmitted from the neighboring objects to the device.

In a preferred embodiment, the control means further co-operate with the search means to: discriminate, amongst the detected neighboring objects, between mobile type objects and fixed type objects; and switch the light source on and/or off only on detecting the appearance or the disappearance of at least one mobile object.

According to various advantageous subsidiary characteristics:
  the device includes a button for forcing the light source to switch on if it is off, or conversely, to switch off if it is on, in response to a specific action by a user on the lighting device;
  the device includes memory means for storing at least one user identifier associated with a corresponding mobile object, and the control means are also adapted to exclude, from recognized mobile objects, those having identifiers that do not correspond with at least one identifier stored in the memory means. Prior matching means may respond to a specific action by the user on a mobile object to store the corresponding user identifier associated with said mobile object;
  the device includes a sensor of ambient lighting level, and means for inhibiting the switching on of the light source as a function of the signal delivered by said lighting sensor. Means may then be provided for emitting a flash from the light source when the control means trigger switching on of the light source but that such switching on is inhibited as a function of the signal delivered by the lighting sensor. Means may also be provided to store long-term variations in ambient lighting level, and the analysis means being adapted to inhibit, or to trigger, switching on and/or off of the light source conditionally as a function of said stored variations.

the analysis means discriminate between objects as a function of an object class parameter and they exclude objects belonging to certain predetermined classes. These object classes may include at least some selected from: mobile telephone, personal digital assistant, computer, keyboard, mouse, desk lamp, switch control unit, headset, toy, and may exclude at least certain classes of the group: keyboard, mouse, desk lamp;

the analysis means discriminate between objects as a function of an object subclass parameter, and for non-excluded classes, they exclude objects belonging to certain predetermined subclasses. For the computer class, these object subclasses may comprise subclasses from the group: portable computer, fixed computer, with the subclass fixed computer being excluded;

the search means determine an internal state associated with a corresponding object, and the control means are also adapted to inhibit or to trigger the switching on and/or off of the light source conditionally as a function of said internal state. By way of example, the internal state is the standby or active state of a mobile object of the portable computer type, or the on or off state of a fixed object of the desk lamp type, or the control state of a remote switch control unit;

the search means further include means for measuring the level at which the radio signal transmitted by the neighboring mobile object is received, and the analysis means are also adapted to evaluate whether variations in the received level of the radio signal are of a nature that is fast or slow and to exclude, from recognized mobile objects, those for which the level does not present said fast variation nature;

the device includes means for statistically evaluating rates of presence/absence over the long term for recognized neighboring mobile objects, and the analysis means are also adapted to inhibit, or to trigger, the switching on and/or off of the light source conditionally as a function of the results of said statistical evaluation;

the device includes infrared sensor means for detecting signal emissions representative of the activity of a remote control for a domestic appliance, and for forcing the light source to switch off in the event of such signal detection ceasing for a predetermined duration;

the device includes intrusion detector means for detecting the presence of at least one person in the vicinity of the device, and for switching the light source off in the event of such detection ceasing for a predetermined duration.

In a particular embodiment, the device: i) draws up a table of neighboring objects detected and identified by the search means; ii) classifies these objects as mobile type objects and as fixed type objects, and excludes the fixed type objects; iii) detects appearance and disappearance events of mobile type objects; and iv) causes the light source to be switched off in the absence of an appearance or a disappearance event being detected over a predetermined duration.

For each object, the table of neighboring objects may comprise at least one field identifying the object and at least one field for a chronological record of the appearance/disappearance events of said object. The field identifying the object includes at least one heading for the group: object address, abridged name, object class, object subclass. The field for a chronological record of appearance/disappearance events includes at least one heading for the group: date of first appearance, date of most recent appearance, date of most recent disappearance, mean number of appearances/disappearances over a given period, mean duration of appearances, relative ratio of appearance periods to disappearance periods.

The invention also provides a lighting installation comprising a plurality of lighting devices as set out above.

In the installation, each device has radio transmitter and receiver means suitable for searching and setting up wireless data-exchange connections with any other lighting device of the lighting installation, and the installation includes means for configuring the lighting devices in a network with one another and with the neighboring objects they have detected.

More precisely, the network configuration means: i) for each device, search for those neighboring objects present in the proximity thereof with which it has been possible to establish an interface connection, from the results of said search, draw up a table of visible neighboring objects, and communicate the visible object table as drawn up in this way to the other devices; and ii) define a network topology from the various visible object tables communicated in this way. They may also designate amongst the devices one of them as the network head device, and define the hierarchical network topology from the head device as designated in this way.

The installation advantageously includes at least one remote switch control unit comprising: i) radio transmitter/receiver means suitable for searching for and setting up a wireless data-exchange connection with each lighting device of the lighting installation; ii) parameter-setting means for designating those of the lighting devices that are to be controlled by said unit; and iii) means for transmitting to each of said lighting devices that are to be controlled thereby a signal for forcing the light source to be switched on or off in response to a specific action of a user on the unit.

It is then preferable to provide means for defining, from the topology of the network, a graph for the distribution of the forcing signal from the switch control unit to said lighting devices that are to be controlled thereby, said distribution taking place either directly from said unit, or indirectly with the signal being relayed, stepwise, via one or more devices of the network.

There follows a description of an embodiment of the device of the invention given with reference to the accompanying drawings in which the same numerical references are used from one figure to another to designate elements that are identical or functionally similar.

FIG. 1 is a diagram of a first embodiment of a lighting device of the invention, in the form of an individual desk lamp, together with various objects involved in operating it.

FIG. 2 is a block diagram showing the various component elements of the FIG. 1 lighting device.

FIG. 3 shows a second embodiment of a lighting device of the invention, in the form of a ceiling lamp associated with a plurality of desks.

FIG. 4 shows a third embodiment of the invention in which a plurality of lighting devices of the kinds shown in FIGS. 1 to 3 are associated together and interact with one another.

FIG. 5 shows a fourth embodiment of the invention, constituting a generalization of the embodiment of FIG. 4 in which all of the lighting devices and objects suitable for interacting therewith are incorporated in an overall network.

As mentioned above, the invention proposes an automatic and "intelligent" system for switching off—and in subsidiary manner switching on—one or more light sources automatically and without human intervention, or with human intervention at a secondary level only.

There follows a description of various embodiments enabling both the switching on and the switching off of light sources to be controlled, but it should be understood that the invention is most particularly applicable to embodiments designed solely for switching light sources off, insofar as the main purpose of the invention is to seek energy savings. Under such circumstances, the system allows users to switch light sources on, with the system managing the switching off of lamps that are superfluous since they are not being used.

The invention makes use of wireless radio interface techniques, and most advantageously those complying with specifications of the Bluetooth (trademark registered in the Bluetooth SIG, Inc.) type or the like.

The use of Bluetooth technology is particularly advantageous given its universal and developing nature, the existence of numerous functions, and also the existence of numerous components, and what's more inexpensive components, that are specially designed for implementing it. At the present time it is also the system that is the most widespread in terms of the number of objects that incorporate short-range wireless communications functions such as: mobile telephone; computer; camera; mouse; keyboard; etc. However the selected technology is not limited in any way, and the invention could be implemented using other wireless transmission techniques, providing they implement the necessary functions, such as for example techniques in compliance with the IEEE 802.11 (ISO/IEC 8802-11) standard known as "WiFi".

DESCRIPTION OF THE CONCEPTS UNDERLYING THE INVENTION

The invention calls on a particular characteristic of Bluetooth technology, namely the possibility for a first appliance fitted with a Bluetooth interface (e.g. a computer) to detect the presence of another appliance also fitted with a Bluetooth interface (portable telephone, computer peripheral, etc.) and that is within radio range, and to do so in a manner that is entirely automatic without the user needing to take any action in order to activate the connection between the two appliances, which connection can become operational immediately as soon as the user arrives, e.g. with a telephone, in the radio range of the first appliance.

The term "object" is used herein to designate any equipment, device, or accessory, whether mobile or fixed, that includes a Bluetooth type radio interface or the like, essentially an interface enabling a first object to detect entirely automatically the presence of a second object (or a plurality of second objects) within radio range of the first, with the appearance or disappearance of the second object in said radio range being verified continuously as a background task.

The objects in question may be pre-existing objects that do not need modification, such as: mobile telephone; headset; portable computer; computer peripheral (mouse, keyboard); personal digital assistant (PDA); camera; toy; etc. The object could equally well be any other appliance that specifically includes a Bluetooth type module or the like for the purposes of the invention, e.g. lighting devices that are described in greater detail below (desk lamp, ceiling lamp), or indeed switch units for remotely controlling such lighting devices.

The detection of nearby Bluetooth objects is provided by the "Inquiry" mode of the Bluetooth protocol, which consists in continuously searching in background mode for new objects present in the radio range of a given object (referred to below as a "device") and recording them in order to verify whether those that have previously been recorded are still present in radio range of said device, or have become absent therefrom.

More precisely, the Bluetooth specifications provide for the following successive steps to be performed as soon as a compatible object, e.g. a mobile telephone incorporating a Bluetooth interface, enters into the range of the device:

"Device Discovery": this first step consists in obtaining from the object its unique identification address (48 bits);

"Name Discovery": the following step consists in obtaining a particular name referred to in the specification as the "Friendly Name" that is given to the object by its user, e.g. the family name of the user of the telephone;

"Association": once the Bluetooth module of the device has identified the address and the name of the recognized object, the following step consists in associating the object with the device (matching), in particular by giving them a shared identifier; and "Service Discovery": the final step consists in informing the device about the functions of the object that can be remotely controlled. This is the last step of the protocol for setting up a Bluetooth connection.

Below, it is merely stated that the object is "matched" with the device when these various steps have been carried out successfully.

This automatic detection is generally the prerequisite for transferring data between the two devices, e.g. updating a directory in the telephone with a directory in the computer, transferring digital photographs to the computer, etc.

In the context of the invention, the automatic detection function is not used for the purpose of transferring data between objects (or it is used in subsidiary manner only for that purpose), but rather it is used essentially for evaluating the activity of a person close to a lighting device: people carry Bluetooth objects with them (a typical example being a mobile telephone) so the lighting device can make use of these "marker" objects to evaluate the activity of one or more people, and possibly cause light sources to be switched on and/or off as a function of the results of the evaluation.

The set of Bluetooth objects detected in this way as being present in a given environment constitutes what the invention refers to as a "cyber-ecosystem", made up of the population of all Bluetooth objects capable of communicating with one another.

These objects may be distinguished by being classified in species.

In a first aspect of the invention, a distinction is drawn between objects that are mobile and objects that are fixed. Typical mobile objects are telephones, portable computers, headsets, etc.; they have the feature of belonging to a person who wears them (telephone) or who might carry them around (portable computer placed on a work surface). In contrast, desk top computers are typical examples of fixed objects.

In a second aspect of the invention, the objects are classified using a binominal scheme comprising a generic name and a specific name, in the manner that is used for classifying natural species. The generic name and the specific name correspond to these two categories: "Major Class Device" and "Minor Class Device" in Bluetooth specifications, that are used during the interrogation stage (Inquiry).

The classes of objects used in the context of the invention could be:

pre-existing classes such as: computer; telephone; headset; toy; etc., with subclasses such as: fixed computer; portable computer; etc.:

classes newly created for the needs of the invention. Amongst these new classes, there are described below the lamp class with the subclasses desk lamp, ceiling lamp, room lamp, and also the switch class (designating more exactly a control unit for a remotely-controlled switch). The objects of the new classes are specially devised for implementing the invention by incorporating a Bluetooth module.

In a third aspect of the invention, certain objects belonging to existing classes are modified by "implanting" a software module making it possible via the Bluetooth interface not only to obtain information concerning the presence or the absence of the object in question, but also information concerning a change in an internal state of the object, e.g. a computer switching to standby mode.

Various embodiments of the invention implementing these concepts are described below.

First Embodiment

Individual Lighting (Desk Lamp)

FIGS. 1 and 2 show a first embodiment of the invention in its simplest version.

The central element is a desk lamp 10 comprising a light source 12 connected to mains by a cable 14 via a module 16, e.g. a module incorporated in the base of the lamp. In a variant, the module may be in the form of an independent accessory suitable for interposing between a traditional lamp and a power outlet.

The module 16 includes a relay 18, which may be a static relay, under the control of a central unit 20. The central unit is associated with a memory 22 and with a Bluetooth radio interface module 24. The various electronics circuits are continuously powered by a converter 26. A reset button 28 is also provided for resetting the central unit 20, e.g. a button placed under the base of the lamp. Furthermore, a switch 30 that is easily accessible enables the user to switch the lamp on and off manually. Finally, a sensor 32 serves to evaluate the ambient lighting level; this sensor is placed in a zone that is protected from direct illumination from the light source 12.

This lamp operates as follows.

It is placed on a work surface, where it constitutes a neighboring object that is fixed (in the "Bluetooth object" sense). There are other objects such as for example a telephone 34 and a portable computer 36, both of which are mobile objects, in general personal objects, worn or carried by a person and likely to move around the desk (and thus the lamps 10) and to sit at the desk.

When the lamp is put into place on the desk, the user matches the lamp with the user's mobile telephone so that the lamp recognizes this particular telephone and thus the user to whom it belongs. This establishes a symbiotic relationship between the lamp and an associated Bluetooth object: the telephone that is specifically matched with the lamp; possibly another telephone; or a particular portable computer, etc. This matching enables the lamp to store the characteristics of the symbiotic connections, and in particular:

the Bluetooth address of the telephone;
its name (Friendly Name);
the type of the peripheral (Major Class Device); and
the sub-type of the peripheral (Minor Class Device).

Once matching has been carried out, the lamp makes a connection and then disconnects.

After this matching stage, the lamp acts at regular intervals, e.g. once every two minutes, to verify whether the telephone in question is present. To perform this detection, the Bluetooth protocol is used in its simplest form, i.e. an Inquiry request is made, without there being any need to take any action on a button or other control of the lamp or the telephone; nor is any data transferred between the lamp and the Bluetooth objects at this stage.

The Inquiry request enables the lamp to be informed about the presence of Bluetooth objects nearby. The disappearance of a Bluetooth object is detected by the Inquiry request giving a negative result.

Comparing the Bluetooth address stored by the lamp with the addresses of detected Bluetooth objects enables the lamp to determine whether a given Bluetooth object is or is not the telephone that is associated therewith by a symbiotic connection, i.e. the telephone with which it has previously been matched.

When the telephone appears in the radio range of the lamp, the lamp may decide to switch itself on by operating the relay 18. If the telephone becomes absent for a duration of sufficient length, then the lamp takes the decision to switch off.

When two telephones are matched with the lamp, the appearance within radio range of the lamp of either one of the two telephones indicates that a user is present and may cause the lamp to switch on; in contrast, in order to decide to switch off, it is necessary for both telephones to be outside the radio range of the lamp.

The switch 30 operates in combination with the automatic control so that the user can under all circumstances switch the lamp on or off. Actions controlled by the switch 30 are executed immediately and unconditionally; they always have priority over actions that are determined automatically by the algorithm performed by the central unit 20.

The effect of operating the switch 30 is to force the lamp to switch on if it is off (but without that inhibiting the switch-off algorithm), or to force the lamp to switch off if it is on (but without that inhibiting the switch-on algorithm).

Thus, assuming that the user enters the office but that the user's telephone battery is flat, the lamp will not switch on automatically; however the switch can be used to switch the lamp on. Conversely, if it is dark, the user may decide to switch on the lamp even though the automatic system has not yet triggered any action.

Various improvements can be applied to the operation described above.

In particular, in order to reduce situations in which the lamp operates in untimely manner, in particular due to false positives, decisions to switch on and—above all—to switch off as taken by the algorithm executed by the central unit 20 may be conditional on criteria other than mere detection of the presence or absence of the object.

In particular, the Bluetooth protocol makes it possible to evaluate the quality of a radio link in the form of a Received Signal Strength Indication (RSSI) value.

After detecting the presence of the telephone that is associated therewith by a symbiotic connection, the lamp measures the RSSI and then, on each Inquiry request, it records the corresponding RSSI value. The sequence of RSSI values is stored and analyzed by the switch-off algorithm:

if the lamp detects a sudden disappearance of the telephone while the value of RSSI is high, it can be confident in assuming that the owner of the telephone has gone away, and it can switch off;

in contrast, if RSSI becomes slowly lower and then, when RSSI is weak, the telephone disappears and then reappears in episodic manner, it is probable that its battery is becoming discharged: under such circumstances, the lamp decides that it is not certain that the telephone has gone away and it does not switch off, at least not immediately.

Another indicator can be obtained by monitoring the presence of the telephone hour by hour. After several days, it is possible to define mean hourly periods during which the telephone is present, and thus to estimate the user's habits.

This analysis serves to define a criterion concerning the probability that the telephone is absent as a function of hourly period, which probability can be used for weighting the other lamp switch-off criteria. It should be observed that this procedure requires no more than detecting events over hourly periods and building up statistics over 24 successive periods, repeatedly over several days; this analysis does not require knowledge of the time of day, and therefore does not require a clock in the lamp to be adjusted.

Furthermore, the algorithm controlling switching on or off can make use of information coming from Bluetooth objects other than the telephone(s).

In particular, the lamp may monitor the portable computer 36 in order to estimate whether the user is present or absent. By using the Major Class Device of the Bluetooth protocol, the lamp knows the category of the object it has detected, and can thus know for example whether the object is a telephone or a computer. The Minor Class Device indicates whether a computer is portable or fixed. In the same manner as it monitors the presence or the absence of a telephone, the lamp may monitor the disappearance of a portable computer from its radio range. The result is the same when the user switches off a desk top computer: the lamp can no longer see it and therefore considers that the user has gone away.

An additional criterion for deciding to switch off the lamp may be the computer switching to standby mode. Most computers are programmed to activate a "screen saver" program automatically whenever the keyboard or the mouse has not been in use for a certain length of time, and the operating system of the computer may advantageously be adapted to transmit information about the status of the computer over the Bluetooth connection, thereby enabling the lamp to know when the computer is on standby. This additional criterion may be combined with the others: for example, when the user's telephone disappears and the computer switches to standby, then it is very certain that the user is away from the desk and the lamp may be switched off.

The indication that the computer has switched to standby may for example serve to modify the "Minor Class Device" so as to define for the class "computer" a subclass "on standby". The change of state may thus be detected on the next Inquiry stage without there being any need to initiate a data transfer. In a variant, it is also possible to send a message from the computer to the lamp using the Serial Port Profile (SPP) of the Bluetooth protocol on switching to standby.

In order to avoid inappropriate operation and in order to increase the pertinence of a decision to switch the lamp off or on, the switch-on or -off algorithm may also take account of ambient light levels as measured by the sensor 32 (which is placed in a zone that is protected from being illuminated directly by the light source).

Thus, when the lamp is off and the telephone appears in its radio range, but ambient light is strong, the lamp does not switch on since there is no need. It may merely indicate that it has indeed detected and recorded the appearance of the telephone by "greeting" the user with a brief light flash. The lamp will switch on later if the telephone is still present and light levels become low.

It is possible to provide for an elaborate algorithm that causes long-term variations in ambient lighting levels detected by the sensor, and that also takes account of the on or off state of the lamp (in order to evaluate the quantity of light coming from the lamp itself).

The algorithm for analyzing variations in lighting level may be of the same type as that described in WO-A-2007/015009 (Seydoux). The algorithm described by that document makes it possible in particular to define automatic on and off trigger thresholds for the back lighting of an LCD display. The teaching of that document can be transposed to the present invention, by inverting the direction of the commands (in the cited document the display should be switched off when it is dark, whereas in the present invention the lamp should be switched on when ambient lighting becomes low, and vice versa).

The algorithm described by that document implemented a calibration stage at the end of which the mean minimum and the mean maximum of daily light levels are determined. These two values serve to determine the dynamic range of the lighting that can be sensed by the detector: if the dynamic range is greater than a predetermined threshold, then the lamp assumes that the algorithm can operate in satisfactory manner; otherwise, it assumes that automatic control as a function of lighting will not be reliable, so such control is deactivated.

Calibration serves not only to validate the account taken of ambient lighting level as a lamp control criterion, but also to define the on and off trigger threshold. Essentially, starting from the mean minimum and mean maximum values (corrected to eliminate less significant samples), the algorithm acts dynamically to determine the transition thresholds from darkness to light and from light to darkness, these two thresholds being different in order to minimize any risk of oscillation between two states. The lightning level measured by the sensor is compared with the thresholds, and the algorithm ensures that a threshold continues to remain crossed for some minimum length of time before validating a change of state of the lamp (on or off): in other words, operation takes place with hysteresis.

Further details and several variants and additions to the algorithm can be found in above-mentioned WO-A-2007/015009.

In addition to the ambient lighting sensor, other sensors may be associated with the lamp.

These other sensors are particularly appropriate when the lamp is used in a home environment, in a sitting or living room.

Under such circumstances, the disappearance of a Bluetooth object is not always a pertinent criterion, insofar as a user at home may very well leave the telephone in the sitting room without being there in person.

It is then possible to associate the lamp with a detector of infrared emissions of the type used by remote controls for televisions, video recorders, video games, etc. The lamp thus has an additional criterion available, i.e. measuring the activity of such remote controls. If a period of no infrared emission follows a period of frequent remote control use, it is probable that there are no longer any users in the room, and that might constitute a pertinent criterion for deciding to switch the lamp off. For example, the lamp may be switched when i) no Bluetooth object has appeared (in contrast, the object might disappear, e.g. a telephone that becomes discharged overnight); and ii) there is no infrared activity coming from a remote control.

Naturally, the lamp possesses its own switch enabling its on or off state to be forced independently of the result of the control algorithm.

In a variant, or in addition, it is possible to use the signal delivered by an intrusion detector (movement detector or thermal detector of the kind used for alarms) to provide a possible additional switch-off criterion for the lamp.

Finally, in addition to the Inquiry protocol for detecting objects in the environment of the lamp, other Bluetooth protocols may be used in subsidiary manner, and in particular:
    the File Transfer Protocol (FTP) protocol for updating the
        software of the lamp via Bluetooth; and the Serial Port Profile (SPP) used in client-server mode to connect a terminal to the lamp so as to adjust certain parameters of its software, to discover the version number of its software, to change its Friendly Name, to modify parameters of its decision-taking algorithms, etc.

Second Embodiment

Shared Lighting (Ceiling Lamp)

FIG. 3 shows a second embodiment of the invention, adapted to shared use.

FIG. 3 shows an open space type office arrangement with a plurality of individual desktops placed close to one another.

Various Bluetooth objects can be seen on the work surfaces, for example:
a portable computer 36;
fixed computers 38;
peripheral such as a Bluetooth keyboard 40; and
an individual lamp 10.

In second embodiment of the invention, the decision-taking element is a shared ceiling lamp 42 located above the work surfaces.

The ceiling lamp 42 incorporates a Bluetooth interface, with internal circuits comparable to those of the individual lamp described above with reference to FIGS. 1 and 2.

Compared with the above-described embodiment, the operation of the ceiling lamp is nevertheless modified to take account of the numerous people likely to be present in the environment of the ceiling lamp, not only people having a desk beneath the ceiling lamp, but also others passing by, possibly with a Bluetooth telephone. A given user may also come and go, and come close to a ceiling lamp that does not correspond to that user's own desk. As a result, it is difficult to envisage asking the various users to match their own telephones with all of the ceiling lamps in the office.

Activity is therefore detected in a different way, without making use of a symbiotic relationship with a particular mobile telephone, as can be done for an individual lamp.

In order to evaluate the activity of people moving in its environment, the ceiling lamp maintains a permanent list of Bluetooth objects situated within its radio range, which objects are detected by the Inquiry stage of the Bluetooth protocol.

For each detected object, the ceiling lamp 42 stores the following in a "Bluetooth objects table":
its Bluetooth address;
its Friendly Name;
its type and sub-type.

In the same table, the ceiling lamp also stores and updates statistical information relating to each object, such as:
the time of its first appearance;
the time of its most recent disappearance;
the mean number of appearances and disappearances over a 24-hour period (mean calculated for example over the preceding 30 days); and
the mean duration of periods of appearance.

In the same table, the ceiling lamp also stores:
the functional category of the object, i.e. "mobile object" or "collaborative object", and for a collaborative object whether or not the object belongs to the same cluster as ceiling lamp or to another cluster. These categories are explained below.

The ceiling lamp also stores a detailed history of appearances, e.g. in a linear list chained to each heading of the "Bluetooth objects table", each time including the time and date of the previous appearance and of the preceding disappearance.

The first step consists in classifying detected Bluetooth objects entered in the "Bluetooth objects table" by functional categories so as to identify those objects that are defined as "mobile objects".

Mobile objects are objects that users are likely to take with them, e.g. objects having as their Major Class Device: Phone, in particular those having as their Minor Class Device either Cellular or Smartphone. The same applies to objects having Computer as their Major Class Device and for which the Minor Class Device is: Laptop, Handheld, Palm, Wearable.

The mobile object category also includes Bluetooth toys, headsets, etc.

In contrast, Bluetooth keyboards and mouses do not form part of the mobile object category: as a general rule users do not carry them about.

Thereafter, the software measures the appearance and disappearance rate of mobile objects. This measurement makes it possible to eliminate from the above list those objects that are identified as being mobile but that do not move, for example portable computers that the users leave permanently on their desks.

The decision to switch the ceiling lamp off is then taken when the mobile objects as selected in this way cease to appear and disappear.

The switch-off criterion may be weighted as a function of statistical data concerning the mean presence of mobile objects per hourly period.

Another category of objects identified by the software of the ceiling lamp is that referred to as "collaborative objects".

In the example shown, these are desk lamps 10 (lamps that are Bluetooth objects, of the same type as those shown in FIGS. 1 and 2), and the screensaver software of computers.

An indication of a change of state of a lamp (switching on or off automatically or else under user control), or a computer switching into standby mode is transmitted to the ceiling lamp by Bluetooth data transfer, for example, in the manner set out for the above-described embodiment, by modifying the "Minor Class Device": for the "desk lamp" class an "off" subclass is defined, and for the "computer" class a "standby" subclass is defined. The change of state can thus be detected on the next "Inquiry" stage without there being any need to initiate a data transfer. In a variant, it is also possible to send a message from the collaborative object to the ceiling lamp using the SPP profile of the Bluetooth protocol on the computer switching to standby or on the lamp changing state.

This information gives the ceiling lamp an indication that is useful for taking a decision to switch on or off.

In the same manner as for the individual lamp in the first described embodiment, control of the ceiling lamp 42 is supervised by a switch 44 having priority over any automatic control, i.e. if the lamp is on, then operating the switch will force it to turn off, and vice versa. It should be observed that operating a switch does not inhibit automatic operation, it merely has the effect of causing the ceiling lamp to switch to the "on" or "off" state in which it is not already, i.e. to anticipate a command to switch on or switch off. In other words, if the ceiling lamp is off and it is forced to switch on by the switch 44, the lamp will switch on and the software will continue to analyze the activity in its environment to cause it to switch off automatically when the time comes.

Third Embodiment

Making a Lighting Network

FIG. 4 shows a third embodiment of the invention, which constitutes a generalization of the embodiments described above.

By way of example, the cyber-ecosystem may be that of a shared desk having all sorts of Bluetooth objects thereon:
- individual lamps 10, 10', ...;
- mobile telephones 34, 34', 34'', ...;
- portable computers 36, 36', ...;
- fixed computers 38, ...; and
- a plurality of ceiling lamps 42, 42', ....

These objects are associated with one another at two levels of organization:

1) around each Bluetooth lamp 10, 10', ... that is matched with a respective telephone 34, 34', .... This level of organization is represented by a continuous outline A, A', ...;

2) around each ceiling lamp 42, 42', ... that measures the activity of all Bluetooth objects in its radio range, regardless of whether they are mobile objects, collaborative objects, or fixed objects; this level of organization is represented by dashed outlines B, B', ....

Each telephone 34, 34', ... is associated by a one-to-one symbiotic relationship with a given lamp 10, 10', .... Each collaborative object is associated with a given ceiling lamp, i.e. any one collaborative object is managed by a single ceiling lamp at a time.

Each ceiling lamp establishes and updates its own "Bluetooth object table" in the manner described above with reference to the second embodiment.

Since each ceiling lamp is itself a Bluetooth object, it can be detected by another ceiling lamp. The ceiling lamp 42 can thus detect within its radio range the presence of the ceiling lamp 42', which is identified as such, e.g. by a specific Friendly Name such as "EcoLamp".

In a manner characteristic of the invention, the various ceiling lamps are configured relative to each other in a network so as to define a hierarchical network topology i) between the ceiling lamps, and ii) from each ceiling lamp to the objects in its vicinity that it is in charge of managing.

For this purpose, the invention makes use in original manner of particular possibilities made available by the Bluetooth specifications to establish not only point-to-point connections between two objects, but also to establish and manage more or less complex networks set up between a certain number of such objects.

A first type of network is known as a piconet, and it is created automatically when a plurality of Bluetooth objects are within radio range of one another. A piconet has a star topology, comprising a master and a plurality of slaves. The slaves may either be "active", i.e. in communication with the master, or "parked", i.e. temporarily asleep with it being possible for the master to wake them up so as to make them active. Communication between the master and the slaves is direct; the slaves cannot communicate with one another.

A second type of network given in the Bluetooth specifications is the scatternet, which is a network made up of a plurality of piconets that are interconnected via common slave, i.e. a slave that has more than one master. This makes it possible to increase the geographical extent of the network by partial overlaps and by chaining between a plurality of piconets.

As explained above, the various ceiling lamps may be configured as a network in a manner that is both automatic and self-adapting, i.e. the organization of the network may be modified automatically, e.g. in the event of a ceiling lamp being added, removed, or moved, and with this taking place in a manner that is entirely transparent for users.

Originally, all of the ceiling lamps are independent and on the same level from the point of view of the topology of the network that is to be configured, i.e. the ceiling lamp that is to become the master of the hierarchical network is not necessarily determined a priori, and it could be any one of the ceiling lamps in the system, depending on circumstances and on the topology of the office.

The first stage of the network configuration protocol is executed autonomously by each of the ceiling lamps.

In accordance with the standard Bluetooth protocol, each ceiling lamp configures itself in a "discoverable" mode so as to enable it to be recognized by the others.

Thereafter, it searches for all other ceiling lamps situated within its radio range, i.e. with which is it capable of setting up satisfactory wireless communication. Because of the spacing between the ceiling lamp and because of the voluntarily-limited range of Bluetooth transmission, it is very likely that certain ceiling lamps will not be visible to all of the others, or that the connection will be of a quality that is too low.

The ceiling lamp also examines whether the Bluetooth object with which it has set up an effective connection is indeed another ceiling lamp for making up a system in accordance with the invention, and not any other kind of Bluetooth object. This compatibility verification may be based in particular on a free Bluetooth parameter that is set in a specific way, for example the Dedicated Inquiry Access Code or a Friendly Name ("EcoLamp") used in common for all ceiling lamps that are compatible with the system of the invention.

On the basis of the results of this search, each ceiling lamp draws up a "proximity table" where each of the ceiling lamps visible thereto is identified in unambiguous manner, e.g. by its Media Access Control (MAC) address, which in the present example is its Bluetooth address. By way of example, for each of the ceiling lamps it finds the table includes its MAC address and the version of its software.

The second stage of the network configuration protocol consists in designating one of all of the ceiling lamps that were discovered during the preceding stage as the head of the network, i.e. as the lamp from which the hierarchy of the network will extend.

The designation of the ceiling lamp that is to be the head of the network is performed by an algorithm that attributes a score as a function of various parameters, e.g. the most recent software version number, the highest MAC address, etc. Each ceiling lamp connects to each of the other ceiling lamps identified in its proximity table to exchange messages enabling the criterion of the interrogated ceiling lamp to be evaluated in comparison with its own criterion.

Each ceiling lamp thus searches for the best "candidate network head" amongst the other listed ceiling lamps, and to confirm its decision, it sends it a question/answer message such as: "Can you do better?" (understood: "...than the score given by the algorithm applied by my proximity table"). The reply will be "I can do better", "I cannot do better", or "I am the head ceiling lamp". Then the ceiling lamp which thinks it has the best score attempts to connect with all of the other ceiling lamps, and so on, stepwise, until the ceiling lamp is found that has the highest score, and that ceiling lamp is then designated as the head ceiling lamp.

After a certain number of iterations, this second stage terminates by designating the ceiling lamp that is the network head.

The third stage of the network configuration protocol is a stage of organizing the network starting from the network head ceiling lamp: here the idea is to go from a configuration in which all of the ceiling lamps perform the same role in the network, and in which it is possible for there to be a plurality of paths to go from one ceiling lamp to another, to a hierarchical network topology in the form of an oriented graph, defining a single path between the head ceiling lamp and all of other ceiling lamps in the network. For this purpose, the head ceiling lamp begins by collecting the proximity tables of all of the other ceiling lamps. Each of them sends its proximity table to the "candidate" found in the preceding step, which in turn sends it to its own "candidate", and so on until the head ceiling lamp is reached.

The head ceiling lamp then explores all of the collected proximity tables and constructs a network graph as a function of the visibilities of each of the ceiling lamps.

A certain number of messages are thus exchanged between the ceiling lamps coming from or going to the head ceiling lamp. This enables it to make a map of the network in its initial form on the basis of the visibility tables of all of the other ceiling lamps, even if one of the ceiling lamps cannot see all of the others. This network may be of very large extent, for example when controlling the lighting of an entire floor in an office.

Depending on the mutual visibilities, several topologies might be possible from the network head, by combining piconets and scatternets in the meaning of Bluetooth specifications. The particular topology chosen may then be determined by criteria such as:

the possibility of establishing a direct connection from the head ceiling lamp to each of the other ceiling lamps in the network (no hidden node);

searching for the simplest possible topology: e.g. avoiding making up any scatternets if a piconet topology is possible and sufficient.

The algorithm constructs a graph in which each node corresponds to a ceiling lamp and in which two nodes are connected together if and only if at least one of the ceiling lamps can see the other.

Once the graph has been constructed, the algorithm determines hinge points, i.e. points of the graph which, if eliminated, would lead to the graph becoming partitioned into a plurality of disconnected components, i.e. into a plurality of distinct sub-graphs.

The configuration of the network is then revised so as to take on a scatternet form, i.e. a chain of piconets. For this purpose, the algorithm uses the visibility graph and recalculates the network optimized by knowledge of hinge points. The result or "routing scheme" that defines the role of each ceiling lamp in the transmission of signals within the network is then in the form of a table of scatternets constituted by the head ceiling lamp and sent in the form of encapsulated messages to each of the ceiling lamps forming the nodes of the graph.

Once this third stage of the initialization process has been completed, the network has been set up and it is operational for managing the clustering of collaborative objects.

The fourth stage of the protocol consists in grouping the collaborative objects detected by the ceiling lamps together in clusters, it being understood that a given collaborative object should be managed by only one ceiling lamp at a time.

The ceiling lamps exchange between one another their "Bluetooth object tables" via the network as set up in the manner described above. When a ceiling lamp receives a table, it verifies the Bluetooth address of the sender to determine its relative position within the network. If the address of the sender is smaller than the ceiling lamp's own address, then it is the ceiling lamp that is in charge of selecting the collaborative object in the "Bluetooth object table". The selection criterion may be constituted in particular by the RSSI value, with priority being given to the ceiling lamp that receives the strongest signal from the collaborative object: it can be assumed that that is the ceiling lamp that is physically closest to the object, and it will then be "put in charge" of the collaborative object in question, with the reference to this particular collaborative object being eliminated from the "Bluetooth object table" in each of the other ceiling lamps.

The criteria for switching ceiling lamps off are of the same type as those explained above for the second embodiment, with it being possible to generalize, e.g. by switching off when:

all of the collaborative objects in the surroundings are off, or are no longer visible; and the rate at which mobile objects appear is zero or very low.

As explained above, the ceiling lamp may rely on statistics taken over several days concerning the rates at which mobile objects appear as a function of time of day, so as to define a variable off threshold as a function of the appearance rate: this threshold will be higher in the middle of the day and lower at off-peak times.

Fourth Embodiment

Centralized Control of the Network

FIG. 5 shows a fourth embodiment, which constitutes a generalization of the embodiment described above with reference to FIG. 4.

The idea is to supervise the entire network by one or more switches 46, and more exactly by one or more control units for remote control switches the control units incorporating respective Bluetooth interfaces. The switch 46 is thus itself a Bluetooth object, unlike the switch 44 in FIG. 3.

This defines an additional level of organization, represented by the outlet C that incorporates i) all of the clusters D, D', . . . corresponding to the respective ceiling lamps 42, 42', . . . and iii) the switch 46 (or the switches if there are several).

The switch 46 is an object that can be configured by software, e.g. using a computer that is connected thereto temporarily.

For this purpose, the switch makes a table of all of the Bluetooth lamps (ceiling lamps and desk lamps) in the network, these lamps including the ceiling lamps 42, 42', . . . and possibly also the desk lamps 10, 10', . . . , if so desired. The search may optionally be limited to some given depth, in order to avoid the process running away, in particular in a building of large dimensions.

The table of lamps collected in this way is transmitted to a computer that is temporarily connected to the switch, and an operator then determines which lamps, amongst all of these lamps, should be under the control of the switch.

By way of example, this step may be performed by displaying the list of lamps found on the screen of the computer and by confirming each of the headings in the list. If the operator selects one of the lamps, that action will have the effect of transmitting corresponding information thereto over the network causing the lamp to flash and enabling the operator to identify its actual position and to confirm that it has indeed been "seen" by the configuration software. The user checks a box if the user desires that lamp to be under the control of the switch, and then continues in like manner to check each of the lamps that are to be under its control.

This operation may be repeated for another switch, possibly with a different selection of lamps.

Switch-on and switch-off instructions are transmitted over the network from the switch 46 to each of the selected lamps.

As with the switches 30 (FIG. 2) and 44 (FIG. 3) described above, the switch 46 in this fourth embodiment serves to force the lamps into another state (lamps that were off are then forced on, and conversely lamps that were on are then forced off), but without that deactivating the automatic switch-on/switch-off algorithm.

The invention claimed is:

1. A lighting device (10; 42) comprising:
   a radio receiver circuit (24);
   search means (20) co-operating with the radio receiver circuit to detect and identify neighboring objects (34, 36, 38, 40) present in the proximity of the device, these neighboring objects being themselves provided with radio transmitter circuits suitable for interfacing with said radio receiver circuits; and
   control means suitable for causing a light source (12) to switch off;
   the device being characterized in that the control means:
      co-operate with the search means (20) to:
         detect the appearance and the disappearance of said neighboring objects in the radio range of the lighting device; and
         cause the light source to switch off upon detecting the disappearance of at least one neighboring object, conditionally as a function of predetermined switch-off criteria; and
      operate essentially without a switch-off order being transmitted from the neighboring objects to the device;
   wherein the search means are also adapted to determine an internal state associated with a corresponding object (10, 36, 46), and the control means are also adapted to inhibit or to trigger the switching on and/or off of the light source conditionally as a function of said internal state and further wherein said corresponding object is a mobile object of the portable computer type (36), and said internal state is the active or standby state of said computer.

2. The device of claim 1, wherein the control means:
   are also suitable for causing the light source (12) to switch on;
   co-operate with the search means (20) to:
      cause the light source to switch on upon detecting the appearance of at least one neighboring object, conditionally as a function of predetermined switch-on criteria; and
      operate essentially without a switch-on order being transmitted from the neighboring objects to the device.

3. The device of claim 2, further including a sensor (38) of ambient lighting level, and means for inhibiting the switching on of the light source as a function of the signal delivered by said lighting sensor.

4. The device of claim 3, further including means for emitting a flash from the light source when the control means trigger switching on of the light source but that such switching on is inhibited as a function of the signal delivered by the lighting sensor.

5. The device of claim 2, wherein the control means further co-operate with the search means (20) to:
   discriminate, amongst the detected neighboring objects, between mobile type objects (34, 36) and fixed type objects (38, 40); and
   switch the light source on and/or off only on detecting the appearance or the disappearance of at least one mobile object.

6. The device according to claim 2, further including a button (30; 44) for forcing the light source to switch on if it is off, or conversely, to switch off if it is on, in response to a specific action by a user on the lighting device (10; 42).

7. The device of claim 2, further including means for storing long-term variations in the ambient lighting level, and wherein the control means are adapted to inhibit, or to trigger, switching on and/or off of the light source conditionally as a function of said stored variations.

8. The device of claim 2, wherein the control means are also adapted to discriminate between objects as a function of an object class parameter, and to exclude objects belonging to predetermined classes of the object classes.

9. The device of claim 2, wherein the search means are also adapted to determine an internal state associated with a corresponding object (10, 36, 46), and the control means are also adapted to inhibit or to trigger the switching on and/or off of the light source conditionally as a function of said internal state.

10. The device of claim 1, wherein the control means further co-operate with the search means (20) to:
    discriminate, amongst the detected neighboring objects, between mobile type objects (34, 36) and fixed type objects (38, 40); and
    switch the light source on and/or off only on detecting the appearance or the disappearance of at least one mobile object.

11. The device of claim 10, further including memory means for storing at least one user identifier associated with a corresponding mobile object, and wherein the control means are also adapted to exclude, from recognized mobile objects, those having identifiers that do not correspond with at least one identifier stored in the memory means.

12. The device of claim 11, further including prior matching means suitable, in response to a specific action of the user on a mobile object, for storing a corresponding user identifier associated with said mobile object.

13. The device of claim 10, wherein the search means further include means for measuring a signal strength level at which the radio signal transmitted by the neighboring mobile object is received, and the control means are also adapted to evaluate whether variations in the signal strength level of the radio signal are of a nature that is fast or slow, and to exclude, from recognized mobile objects, those for which the signal strength level does not present said fast variation nature.

14. The device of claim 10, further including means for:
    establishing a list of neighboring objects detected and identified by the search means;
    classifying the objects in this table as mobile type objects and fixed type objects, and excluding the objects of the fixed type;
    detecting appearance or disappearance events concerning mobile type objects; and
    switching the light source off in the absence of an appearance or disappearance event being detected during a predetermined duration.

15. The device according to claim 1, further including a button (30; 44) for forcing the light source to switch on if it is off, or conversely, to switch off if it is on, in response to a specific action by a user on the lighting device (10; 42).

16. The device of claim 1, further including means for storing long-term variations in the ambient lighting level, and wherein the control means are adapted to inhibit, or to trigger, switching on and/or off of the light source conditionally as a function of said stored variations.

17. The device of claim 1, wherein the control means are also adapted to discriminate between objects as a function of an object class parameter, and to exclude objects belonging to predetermined classes of the object classes.

18. The device of claim 17, wherein the predetermined classes include at least certain classes of the group: mobile telephone, personal digital assistant, computer, keyboard, mouse, desk lamp, switch control unit, headset, toy, and the predetermined classes related to objects to be excluded including at least certain classes of the group: keyboard, mouse, desk lamp.

19. The device of claim 17, wherein the control means are also adapted to discriminate between objects as a function of an object subclass parameter, and for the non-excluded classes to exclude objects belonging to certain predetermined subclasses.

20. The device of claim 19, wherein the object subclasses include, for the computer class, the subclasses of the group: portable computer, fixed computer, with the subclass fixed computer being excluded.

21. The device of claim 1, wherein said corresponding object is a fixed object of the desk lamp type (10), and said internal state is the on or off state of said lamp.

22. The device of claim 1, wherein said corresponding object is a fixed object of the switched control unit type (46), and said internal state is the control state thereof.

23. The device of claim 1, further including infrared sensor means for detecting signal emissions representative of the activity of a remote control for a domestic appliance, and for forcing the light source to switch off in the event of such signal detection ceasing for a predetermined duration.

24. The device of claim 1, further including means for detecting the presence of at least one person in the vicinity of the device of the intrusion detector type, and for forcing the light source to switch off in the event of such present detections ceasing over a predetermined duration.

25. The device of claim 1, characterized in that it includes:
a plurality of lighting devices, each lighting device (42) including radio transmitter and receiver means suitable for searching for and setting up a wireless data-exchange connection with any other device of the installation; and
means for configuring the lighting devices in a network including the lighting devices and the neighboring objects they have detected.

26. The device of claim 25, wherein the network configuration means are means adapted:
for each device, to search for which nearby neighboring objects present in the proximity thereof with which it is possible to establish an interfacing connection, to draw up from the results of this search a table of visible neighboring objects, and to communicate the table of visible objects as drawn up in this way with the other devices; and
to define a network topology from the various visible object tables as communicated in this way.

27. The device of claim 26, wherein the network configuration means are also adapted:
to designate amongst the devices one of them as the network head device; and
to define said topology as a hierarchical network from the head device as designated in this way.

28. The device of claim 25, further including at least one remote central switch unit (46) including:
radio transmitter/receiver means suitable for searching for and setting up a wireless data-exchange connection with each lighting device (42) of the device;
means for setting which of the lighting devices are to be under the control of said unit; and
means for transmitting to each of said lighting devices that are to be controlled thereby a signal to force the light source to switch on or off, in response to a specific action by the user on the unit.

29. The device of claim 28, further including means for defining, from the topology of the network, a graph for the distribution of the forcing signal from the switch control unit to said lighting devices that are to be controlled thereby, said distribution taking place either directly from said unit, or indirectly with the signal being relayed, stepwise, via one or more devices of the network.

30. A lighting device (10; 42) comprising:
a radio receiver circuit (24);
search means (20) co-operating with the radio receiver circuit to detect and identify neighboring objects (34, 36, 38, 40) present in the proximity of the device, these neighboring objects being themselves provided with radio transmitter circuits suitable for interfacing with said radio receiver circuits; and
control means suitable for causing a light source (12) to switch off;
the device being characterized in that the control means:
co-operate with the search means (20) to:
detect the appearance and the disappearance of said neighboring objects in the radio range of the lighting device; and
cause the light source to switch off upon detecting the disappearance of at least one neighboring object, conditionally as a function of predetermined switch-off criteria; and
operate essentially without a switch-off order being transmitted from the neighboring objects to the device;
means for statistically evaluating rates of presence/absence over the long term for recognized neighboring mobile objects, and wherein the control means are also adapted to inhibit, or to trigger, the switching on and/or off of the light source conditionally as a function of the results of said statistical evaluation.

31. A lighting device (10; 42) comprising:
a radio receiver circuit (24);
search means (20) co-operating with the radio receiver circuit to detect and identify neighboring objects (34, 36, 38, 40) present in the proximity of the device, these neighboring objects being themselves provided with radio transmitter circuits suitable for interfacing with said radio receiver circuits; and
control means suitable for causing a light source (12) to switch off;
the device being characterized in that the control means:
co-operate with the search means (20) to:
detect the appearance and the disappearance of said neighboring objects in the radio range of the lighting device; and
cause the light source to switch off upon detecting the disappearance of at least one neighboring object, conditionally as a function of predetermined switch-off criteria; and operate essentially without a switch-off order being transmitted from the neighboring objects to the device;

wherein the control means further co-operate with the search means (20) to:
  discriminate, amongst the detected neighboring objects, between mobile type objects (34, 36) and fixed type objects (38, 40); and
  switch the light source on and/or off only on detecting the appearance or the disappearance of at least one mobile object;

means for establishing a list of neighboring objects detected and identified by the search means;

means for classifying the objects in this table as mobile type objects and fixed type objects, and excluding the objects of the fixed type;

means for detecting appearance or disappearance events concerning mobile type objects; and means for switching the light source off in the absence of an appearance or disappearance event being detected during a predetermined duration;

wherein said neighboring object table includes, for each object, at least one object identification field and at least one field for a chronological record of appearance/disappearance events of said object.

32. The device of claim 31, wherein the object identifier field includes at least one heading for the group: object address, abridged name, object class, object subclass.

33. The device of claim 31, wherein the field for the chronological record of appearance/disappearance events includes at least one heading for the group: date of first appearance, date of most recent appearance, date of most recent disappearance, mean number of appearances/disappearances over a given period, mean duration of appearances, relative ratio of appearance periods to disappearance periods.

34. A lighting device (10; 42) comprising:
a radio receiver circuit (24);
search means (20) co-operating with the radio receiver circuit to detect and identify neighboring objects (34, 36, 38, 40) present in the proximity of the device, these neighboring objects being themselves provided with radio transmitter circuits suitable for interfacing with said radio receiver circuits; and
control means suitable for causing a light source (12) to switch off;
the device being characterized in that the control means:
  co-operate with the search means (20) to:
    detect the appearance and the disappearance of said neighboring objects in the radio range of the lighting device; and
    cause the light source to switch off upon detecting the disappearance of at least one neighboring object, conditionally as a function of predetermined switch-off criteria; and
  operate essentially without a switch-off order being transmitted from the neighboring objects to the device;
wherein the control means:
  are also suitable for causing the light source (12) to switch on;
  co-operate with the search means (20) to:
    cause the light source to switch on upon detecting the appearance of at least one neighboring object, conditionally as a function of predetermined switch-on criteria; and
  operate essentially without a switch-on order being transmitted from the neighboring objects to the device;
means for statistically evaluating rates of presence/absence over the long term for recognized neighboring mobile objects, and wherein the control means are also adapted to inhibit, or to trigger, the switching on and/or off of the light source conditionally as a function of the results of said statistical evaluation.

* * * * *